United States Patent [19]

Holohan, Jr.

[11] Patent Number: 4,732,936

[45] Date of Patent: Mar. 22, 1988

[54] ALPHA METHYLSTYRENE AND PARA METHYLSTYRENE COPOLYMERS

[75] Inventor: John F. Holohan, Jr., Allegheny County, Pa.

[73] Assignee: Hercules Incorporated, Wilmington, Del.

[21] Appl. No.: 810,133

[22] Filed: Dec. 17, 1985

Related U.S. Application Data

[63] Continuation of Ser. No. 673,250, Nov. 20, 1984, abandoned, which is a continuation-in-part of Ser. No. 592,659, Mar. 23, 1984, abandoned.

[51] Int. Cl.$^4$ .................. C08L 53/02; C08F 212/06
[52] U.S. Cl. ........................ 525/88; 525/95; 525/98; 526/346; 526/347
[58] Field of Search .............. 526/347, 347.1, 346; 525/95, 98, 88; 156/334

[56] References Cited

U.S. PATENT DOCUMENTS

| | | | |
|---|---|---|---|
| 2,302,464 | 10/1942 | Palmer et al. | 260/86 |
| 3,000,868 | 9/1961 | Powers | 260/88.2 |
| 3,630,981 | 12/1971 | Finfinger et al. | 260/28.5 |
| 3,640,981 | 2/1972 | Davis | 260/88.2 |
| 3,753,961 | 8/1973 | Cyr | 526/347 X |
| 3,803,079 | 4/1974 | Hokama | 526/64 X |
| 3,956,250 | 5/1976 | Campbell et al. | 526/194 |
| 4,063,011 | 12/1977 | Campbell et al. | 526/194 |
| 4,113,801 | 9/1978 | Douglas et al. | 525/98 |
| 4,259,220 | 3/1981 | Bunnelle et al. | 260/27 |
| 4,306,049 | 12/1981 | Prapas | 526/347 |

OTHER PUBLICATIONS

Nakajima, N., "Polymer Molecular Weight Methods", A.C.S. Advances in Chem. Series 125, A.C.S., Wash., D.C. (1973), pp. 98–107.

"Polymer Handbook", Biandrup, J. (ed.), Wiley-Interscience, N.Y., N.Y. (1975), p. III-154.

Primary Examiner—Joseph L. Schofer
Assistant Examiner—F. M. Teskin
Attorney, Agent, or Firm—Joanne L. Horn; Marion C. Staves; John P. Luther

[57] ABSTRACT

Disclosed are copolymers of alpha methylstyrene and para methylstyrene having Ring & Ball softening points greater than 140° C., a Tg of greater than 100° C. to 110° C., a weight average molecular weight ($\overline{M}w$) of less than 15,000, and a molecular weight distribution of about 2 to about 3. These copolymers are useful in adhesives, sealants and molding compounds, especially as reinforcing or modifier resins for thermoplastic block copolymers having aromatic and aliphatic blocks contained in pressure sensitive adhesives.

8 Claims, No Drawings

ALPHA METHYLSTYRENE AND PARA METHYLSTYRENE COPOLYMERS

This application is a continuation of application Ser. No. 673,250, filed Nov. 24, 1984, now abandoned, which is a continuation-in-part of the application, Ser. No. 592,659, filed Mar. 23, 1984, for Alpha Methylstyrene and Para Methylstyrene Copolymers, now abandoned.

This invention relates to copolymers of alpha methylstyrene (AMS) and para methylstyrene (PMS), and their use in adhesives, sealants and molding compounds.

Resinous copolymers of styrene are described in the art. U.S. Pat. No. 2,302,464 relates to copolymers of a styrene having a tertiary alpha carbon in the side chain, such as AMS, with a styrene having a secondary alpha carbon atom in the side chain, such as PMS. The copolymers of this patent are prepared by allowing mixtures of the monomers to stand at room temperatures. However, the formation of these copolymers may be accelerated by heating the monomer mixture, by subjecting the monomer mixture to the action of light, or by the use of catalytically active oxidizing agents, such as ozone and benzoyl peroxide.

Further, it is known that monomers of AMS and of vinyl toluene may be copolymerized to form copolymers having Ring & Ball (R&B) softening points ranging from 10° C. to 130° C. For example, copolymers of 25% to 30% AMS and 75% to 65% vinyl toluene having R&B softening points of 100° to 130° C. are disclosed in U.S. Pat. No. 3,000,868. Copolymers of 40% to 60% AMS and 60% to 40% vinyl toluene having R&B softening points from 100° to 130° C. are taught in U.S. Pat. No. 3,640,981.

Other copolymers of AMS and vinyl toluene having R&B softening points below 100° C. are described in U.S. Pat. Nos. 3,630,981, 3,956,250 and 4,063,011.

Although it is not always clear in the above-mentioned prior art, the monomer vinyl toluene generally referred to as the vinyl toluene mixture commercially available. Such vinyl toluene mixture comprises a mixture of approximately 65% of the meta isomer and 35% of the para isomer.

Recently a method of preparing pure or essentially pure isomers of vinyl toluene has been discovered. Hence, isomeric mixtures of vinyl toluenes or methylstyrenes are now available where the para isomer is present in an amount from 85% to 99% by weight, the meta isomer is present in amounts less than 15%, and the ortho isomer in trace amounts.

U.S. Pat. No. 4,306,049 is directed to the polymerization of such isomeric mixtures of methylstyrenes to produce polymers having a glass transition temperature greater than 105° C., a Vicat softening temperature of at least 108° C., and a molecular weight of at least 30,000. Random copolymers of the isomeric mixture with other vinyl monomers, such as AMS are disclosed.

These prior art copolymers have been used in adhesives, such as pressure sensitive adhesives, however they have a number of drawbacks.

The prior art copolymers do not have high R&B softening points, i.e. greater than 140° C. Hence, the cohesive strength of the adhesives containing such copolymers is reduced at high temperatures.

The molecular weight of the prior art copolymers is too high, i.e. 30,000 or more. Such copolymers are usually not compatible with the aromatic end blocks of thermoplastic block copolymers. Hence, they form a third dispersed phase which tends to adversely affect the tack properties of adhesives containing both a prior art copolymer and aromatic-containing block copolymer. Moreover, the third dispersed phase becomes separated during storage periods.

As used herein thermoplastic block copolymers means block copolymers having aromatic and aliphatic blocks.

Often these prior art copolymers have a lower glass transition temperature (Tg) than polystyrene, i.e. less than 100° C. Such copolymers will decrease the glass transition temperature of the aromatic blocks of thermoplastic block copolymers, and thereby reduce the cohesive strength of the adhesive at high temperatures.

Similarly, the prior art copolymers have some of the same adverse affects on shoe soles, floor runners, toys, and rubber bands containing thermoplastic block copolymers.

According to this invention there is provided AMS-PMS copolymers having R&B softening points greater than 140° C., a glass transition (Tg) temperature of greater than 100° C. to 110° C., a weight average molecular weight ($\overline{M}w$) less than 15,000, and a molecular weight distribution of about 2 to about 3 (weight average molecular weight/number average molecular weight, $\overline{M}w/\overline{M}n$). Typically, the copolymers contain from about 25% to about 75% AMS and from about 75% to about 25% PMS. Preferably, the copolymers contain from about 40% to about 60% AMS and from about 60% to about 40% PMS. Preferably the R&B softening point is greater than 150° C. and the $\overline{M}w$ is from about 5,000 to about 10,000. Most preferably, the R&B softening point is from about 152° to about 170° C., and the $\overline{M}w$ is from about 5,000 to less than 10,000. Preferably, the copolymer has a molecular weight distribution of less than 3. Most preferably, the copolymer has a molecular weight distribution of about 2.5 to less than 3. Typically, the copolymer has repeating units of from 50 to about 100. Preferably, the Tg is greater than 100° C. to about 107° C.

The copolymers of this invention are prepared by treating AMS with an isomeric mixture of ortho, meta and para methylstyrene wherein the proportion of the para isomer is at least 85% of the mixture, the meta isomer is less than 15% of the mixture, and the ortho isomer is present in trace amounts in an inert solvent with a gaseous boron triflouride (BF$_3$) catalyst at a temperature from −10° C. to about 30° C. Generally, the ortho isomer is present in amounts of about 0.05%. Preferably the para isomer is at least 95% of the mixture and the meta isomer is less than 5% of the mixture. Typically, from about 0.15% to about 0.25% of the BF$_3$, by weight of the monomers present, is used. A slight excess of BF$_3$ is generally used to complete the reaction. Any of the catalytically active BF$_3$ complexes well known in the art may be employed in place of the BF$_3$, for example, BF$_3$ phenol complex. Light aromatic petroleum solvents, which are commercially available, are suitable solvents.

Monomer concentration in the solvent is immaterial, being governed by practical considerations, such as the polymerization temperature, the viscosity of the AMS-PMS copolymer, and the capabilities of the equipment being used. From a practical standpoint, therefore, this upper limit is approximately 60% monomer in solvent, by weight.

The isomer mixture may also contain trace amounts of impurities and other materials. The analysis of a typical isomer mixture is set forth in column 2 of U.S. Pat. No. 4,306,049.

The isomer mixture is obtained by the catalytic dehydrogenation of a mixture of the corresponding ethyl toluenes, which in turn is obtained by the selective alkylation process disclosed in U.S. Pat. Nos. 4,086,287 and 4,143,084.

The mixture of isomeric ethyl toluenes may be subjected to distillation prior to the dehydrogenation step in order to separate out various by-products. After the dehydrogenation has been completed, a further distillation may be carried out to separate the methyl styrenes from their saturated precursors.

The proportion of the PMS in the isomeric mixture is so high, i.e. at least 85 by weight, that the mixture can be regarded essentially as the para isomer.

The AMS is available commercially from numerous sources.

All parts and percentages used in this specification are by weight unless otherwise specified.

The AMS-PMS copolymers are useful in adhesives, sealants and molding compounds. For example, these copolymers are useful in pressure sensitive adhesives, construction adhesives, assembly adhesives, sheet molding compounds, compression molding compounds, injection molding compounds, reaction injection molding compounds, and extrusion molding compounds. They are particularly useful as reinforcing and modifying resins for commercially available thermoplastic block copolymers, such as, styrene-isoprene-styrene, styrene-butadiene-styrene and styrene-ethylene-butylene-styrene block copolymers. As used herein, the monomer means the polymer of the monomer when it refers to the thermoplastic block copolymers or to the blocks, segments or domains thereof. For example, styrene-isoprene-styrene means polystyrene-polyisoprene-polystyrene. Likewise, styrene block, segment or domain means the polystyrene block, segment or domain of the thermoplastic block copolymer. Such block copolymers are useful in the preparation of adhesives, especially pressure sensitive adhesives, shoe soles, floor runners, toys, rubber bands and the like. Pressure sensitive adhesives containing block copolymers can be prepared by any conventional means. For example, the adhesives can be prepared by dry blending the ingredients in conventional mixing equipment, such as a Sigma mixer, at 180° C., or by solvent processing the ingredients in a solvent, such as toluene, in an automatic tumbler.

The following examples illustrate various aspects of this invention. They are not intended to limit the invention. Modifications of the specific AMS-PMS copolymers, adhesives prepared with the AMS-PMS copolymers and procedures of these examples can be made without departing from the spirit and scope of this invention.

EXAMPLE 1

This example illustrates a preferred specific embodiment of the AMS-PMS copolymer of this invention, and how to prepare it.

A mixing vessel equipped with a stirrer is charged with 650 g AMS, 650 g PMS and 1,950 g of a light aromatic petroleum solvent and stirred until a homogeneous monomer solution is obtained. The monomer solution is then dried by passing it through a column of activated alumina. A 3-neck reaction flask equipped with a stirring assembly and a thermometer is charged with 3,000 g of the dried monomer solution containing 40% monomers, by weight. One neck of the flask is adapted to receive a flow of nitrogen to blanket the flask contents, and another neck is adapted with a tube to deliver gaseous $BF_3$ below the surface of the monomer solution. One of the necks of the flask is vented to prevent super-atmospheric pressure build-up caused by the incoming gases.

The monomer solution is continuously stirred, and the flask contents are brought to a temperature of 23° C. using a heating mantle or dry ice-isopropanol cooling bath, as appropriate, to maintain the temperature of the reactants at 23° C.

$BF_3$ is introduced through a pre-calibrated rotameter at the rate of approximately 0.01% by weight of the monomers present per minute. In addition to the cooling bath, any temperature increase above 23° C. may be controlled by decreasing the $BF_3$ flow rate, or, if desired, stopping the $BF_3$ flow completely. Approximately 2.0 g $BF_3$ is used or 0.17% by weight of the monomers present.

Upon completion of the $BF_3$ addition, the reaction mixture is maintained at 23° C. for approximately one hour to assure completion of the polymerization. At the end of this soak period, 60 g hydrated lime is added to the reaction mixture to consume the $BF_3$ and quench the reaction.

The reaction mixture is heated to from 80° to 90° C. to expedite neutralization of the $BF_3$, and to lower the reaction mixture viscosity for ease of handling. The mixture is filtered through a bed of filter aid in a Buchner perforated-plate funnel using vacuum assistance.

The filtrate is transferred to a distillation flask fitted with a distillation head containing a thermometer and a length of glass tubing reaching to the bottom of the flask. The distillation head is connected to a condenser, which empties into a suitable receiving vessel. Gaseous nitrogen is introduced through the glass tube, and the filtrate is distilled under a nitrogen sparge at a temperature of 205°–215° C. When the distillation of the filtrate is complete, the nitrogen is disconnected and live steam is introduced. Distillation is continued, while steam stripping, at a temperature of 235° C.±5° C. to remove any low molecular weight polymer and heavy oils.

On completion of distillation, nitrogen is again connected to the sparge tube for several minutes to blow the residual moisture from the molten polymer. The molten polymer is then poured into a suitable tray and allowed to cool. 1158 g copolymer product is recovered, or 96.5% based on the monomers originally charged. The copolymer is water-white, has a R&B softening point of 159° C., a Tg of about 101° C. (measured by differential scanning colorimetry), $\overline{M}w$ of 6200 as determined by gel permeation chromatography, and a molecular weight distribution of 2.0.

EXAMPLE 2

This example illustrates another specific embodiment of the AMS-PMS copolymer of this invention.

The AMS-PMS copolymer is prepared according to the formulation and procedure of Example 1 except that a mixture of 222 g AMS, 148 g PMS and 370 g light aromatic petroleum solvent is dried instead of 650 g AMS, 650 g PMS and 1,950 g of a light aromatic petroleum solvent. This monomer solution contains 50% total monomers in a ratio 60 parts AMS:40 parts PMS.

625 g of this dried monomer solution and 1.0 g of BF₃ is used and the reaction is terminated with 30 g hydrated lime.

293.6 g copolymer product is recovered, or 94.0% based on the monomers originally charged. The product is water-white, has a softening point of 158° C., $\overline{M}w$ of 5800, and a molecular weight distribution of 2.6.

EXAMPLE 3

This example illustrates another specific embodiment of the AMS-PMS copolymers of this invention.

The AMS-PMS copolymer is prepared according to the formulation and procedure of Example 1 except that a mixture of 104 g AMS, 156 g PMS and 390 g light aromatic petroleum solvent is dried instead of 650 g AMS, 650 g PMS and 1,950 g of a light aromatic petroleum solvent, and 600 g of this dried monomer solution is used. This monomer solution contains 40% total monomers in a ratio 40 parts AMS:60 parts PMS. The temperature is adjusted to 30° C. until the polymerization is complete.

230.0 g copolymer product is recovered, or 95.8% based on the monomers originally charged. The product is water-white, has a softening point of 158° C., $\overline{M}w$ of 8200, and a molecular weight distribution of 2.2.

EXAMPLE 4

This example illustrates another specific embodiment of the AMS-PMS copolymers of this invention.

The AMS-PMS copolymer is prepared according to the formulation and procedure of Example 1 except that a mixture of 246 g AMS, 82 g PMS and 328 g of a light aromatic petroleum solvent is dried instead of 650 g AMS, 650 g PMS and 1,950 g of a light aromatic petroleum solvent, and 600 g of this dried monomer solution is used. This monomer solution contains 50% total monomers in a ratio 75 parts AMS:25 parts PMS. The temperature is adjusted to 10° C. until the polymerization is complete.

271.0 g copolymer product is recovered, or 90.3% based on the monomers originally charged. The product is water-white, has a softening point of 162° C., $\overline{M}w$ of 6300, and a molecular weight distribution of 3.1.

EXAMPLE 5

This example illustrates another specific embodiment of the AMS-PMS copolymers of this invention.

The AMS-PMS copolymer is prepared according to the formulation and procedure of Example 1 except that a mixture of 78 g AMS, 182 g PMS and 390 g of a light petroleum solvent is dried instead of 650 g AMS, 650 g PMS and 1,950 g of a light aromatic petroleum solvent, and 600 g of this dried monomer solution is used. This monomer solution contains 40% total monomers in a ratio 30 parts AMS:70 parts PMS. The temperature is adjusted to 30° C. until the polymerization is complete.

231.8 g copolymer product is recovered, or 96.6% based on the monomers originally charged. The product is water-white and has a softening point of 157° C.

EXAMPLE 6

This example illustrates another embodiment of this invention.

Various amounts of the copolymer of Example 1 and 10 parts by weight of a thermoplastic block copolymer having a isoprene midblock and styrene end blocks commonly referred to as a styrene-isoprene-styrene (SIS) block copolymer are changed into an automatic tumbler containing sufficient toluene solvent to give 45% solids, and mixed until the solution is homogeneous (24 hours). The solution is coated onto a polyester film at 1 mil thickness and dried at room temperature (23° C.) for one hour. It is then dried in a vacuum oven at 40° C. for three hours before aging overnight uncovered in an ambient temperature cabinet for 24 hours. The resultant composition and the properties thereof are set forth below in Table I.

TABLE I

| Parts by Weight | | | | $Tg,^2$ |
|---|---|---|---|---|
| SIS | Example 1 Copolymer | Appearance | SAFT, °C[1] | Isoprene Midblock °C. |
| 10.0 | 0.0 | clear | 128 | −50 |
| 10.0 | 4.5 | clear | 137 | −50 |
| 10.0 | 7.0 | clear | 138 | −50 |
| 10.0 | 10.0 | translucent | 140. | −50 |

[1]SAFT = Shear Adhesion Failure Temperature; the temperature at which a 1 × 1 inch lap shear bond fails under a 1 kg load. The bond is between steel and a 2-mil Mylar film coated with a 1-mil thickness of the adhesive blend. The temperature is increased at the rate of 40° F. per hour.
[2]Tg = Glass transition temperature as determined by rheometrics dynamic spectrometer.

The compatibility of the copolymer with the SIS block copolymer is indicated by clarity of the blends. The reinforcing effect of the copolymer on the styrene blocks of SIS is indicated by the increased SAFT of the blends. Moreover, the consistent −50° C. Tg of the isoprene midblocks indicates that the copolymer of this invention has not migrated into the midblock domains, even when present at its upper limit of compatibility.

Bleed of an aromatic end-block reinforcing resin into the aliphatic midblocks of these block copolymer thermoplastic rubbers is undesirable since it causes a loss in tackifying properties of the adhesive formulations, especially pressure sensitive adhesive formulations.

The AMS-PMS copolymers of this invention which are suitable for reinforcement of aromatic end blocks of thermoplastic block copolymers in pressure sensitive adhesives have a R&B softening point greater than about 150° C., a $\overline{M}w$ of about 5,000 to less than about 10,000, and a Tg of greater than 100° C. to about 110° C. These copolymers must also have a molecular weight distribution of about 2.5 to less than 3 (weight average molecular weight/number average molecular weight, $\overline{M}w/\overline{M}n$) in order to obtain a pressure sensitive adhesive with high temperature performance. AMS-PMS copolymers having a broad molecular weight distribution contain high molecular weight segments which are not compatible with the aromatic end blocks and contain low molecular weight segments which bleed into the aliphatic mid blocks. As stated before, any bleeding into the aliphatic mid block changes the glass transition temperature of the mid block thereby reducing the overall tackifying properties of the adhesive.

A typical pressure sensitive adhesive formulation contains from about 30% to about 50% of a thermoplastic block copolymer, from about 30% to about 50% of a tackifying resin, and from about 15% to 25% of a reinforcing or modifier resin for the aromatic blocks as its principal ingredients, the total of which is 100%. Preferably the pressure sensitive adhesive formulation contains from about 35% to about 45% thermoplastic block copolymer, 35% to about 45% tackifying resin, and from about 18% to about 22% modifier resin.

Suitable thermoplastic block copolymers are set forth herein above. Typical tackifying resins are those resins having tackifying properties which are compatible with the aliphatic domains of the block copolymer. Such resins include hydrocarbon resins prepared by polymerizing the monomer mixture of a five carbon component stream, known as a $C_5$ stream, from petroleum refining, the monomers being primarily aliphatic. Typically, they have a R&B softening point of from 85° C. to about 100° C.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

I claim:

1. A copolymer having a R&B softening point of greater than 150° C. and as high as about 162° C., a tg of greater than 100° C., a $\overline{M}w$ of about 5,000 to about 10,000, a molecular weight distribution of less than 3 and derived from by weight, about 75% to about 25% alpha methylstyrene and from about 25% to about 75% of an isomeric mixture of vinyl toluene having at least 95% of the para isomer, less than 5% of the meta isomer and trace amounts of the ortho isomer.

2. The copolymer of claim 1, wherein alpha methylstyrene is present is an amount of from about 40% to about 60% and the isomeric mixture of vinyl toluenes is present in an amount from about 40% to about 60%.

3. In a pressure sensitive adhesive composition having, by weight, from about 30% to about 50% of a thermoplastic block copolymer, from about 30% to about 50% of a tackifying resin, and from about 15% to about 25% of a modifier resin, the improvement which comprises using the copolymer of claim 1 as the modifier resin.

4. The copolymer of claim 2 wherein the $\overline{M}w$ is from about 5,000 to less than 10,000.

5. In a pressure sensitive adhesive composition having, by weight, from about 30% to about 50% of a thermoplastic block copolymer, from about 30% to about 50% of a tackifying resin, and from about 15% to about 25% of a modifier resin, the improvement which comprises using the copolymer of claim 2 as the modifier resin.

6. In a pressure sensitive adhesive composition having, by weight, from about 30% to about 50% of a thermoplastic block coplymer, from about 30% to about 50% of a tackifying resin, and from about 15% to about 25% of a modifier resin, the improvement which comprises using the copolymer of claim 4 as the modifier resin.

7. A copolymer having an R&B softening point of greater than 150° C. and as high as about 162° C., a tg of greater than 100° C., a $\overline{M}w$ of about 5,000 to about 10,000, a molecular weight distribution of about 2.5 to about 3 and derived from, by weight, about 25% to about 75% alpha methylstyrene and from about 75% to about 25% of an isomeric mixture of vinyl toluene having at least 95% of the para isomer, less than 5% of the meta isomer and trace amounts of the ortho isomer.

8. In a pressure sensitive adhesive composition having, by weight, from about 30% to about 50% of a thermoplastic block copolymer, from about 30% to about 50% of a tackifying resin, and from about 15% to about 25% of a modifier resin, the improvement which comprises using the copolymer of claim 7 as the modifier resin.

* * * * *